(12) United States Patent
Bush et al.

(10) Patent No.: US 10,113,676 B2
(45) Date of Patent: Oct. 30, 2018

(54) CLIP FOR ADJUSTABLE PIPE FITTING

(71) Applicant: SDB IP HOLDINGS, LLC, Oviedo, FL (US)

(72) Inventors: Shawn D. Bush, Orlando, FL (US); Rock R. Allard, III, Oviedo, FL (US)

(73) Assignee: SDB IP Holdings, LLC, Oviedo, FL (US)

( * ) Notice: Subject to any disclaimer, the term of this patent is extended or adjusted under 35 U.S.C. 154(b) by 262 days.

(21) Appl. No.: 14/629,994

(22) Filed: Feb. 24, 2015

(65) Prior Publication Data

US 2015/0338001 A1 Nov. 26, 2015

Related U.S. Application Data

(60) Provisional application No. 61/944,277, filed on Feb. 25, 2014.

(51) Int. Cl.
| | |
|---|---|
| *F16L 21/06* | (2006.01) |
| *F16L 21/035* | (2006.01) |
| *F16L 43/00* | (2006.01) |
| *E03D 5/00* | (2006.01) |
| *F16L 37/14* | (2006.01) |

(52) U.S. Cl.
CPC .............. *F16L 21/06* (2013.01); *E03D 5/00* (2013.01); *F16L 21/035* (2013.01); *F16L 37/144* (2013.01); *F16L 43/00* (2013.01)

(58) Field of Classification Search
CPC .................................................... F16L 37/144
USPC ........................................................ 285/305
See application file for complete search history.

(56) References Cited

U.S. PATENT DOCUMENTS

| | | | | |
|---|---|---|---|---|
| 2,021,241 | A | * | 11/1935 | Mall ........................ F16B 21/16 15/410 |
| 3,314,696 | A | * | 4/1967 | Ferguson .............. F16L 37/088 285/305 |
| 3,527,485 | A | | 9/1970 | Goward et al. |
| 3,538,940 | A | | 11/1970 | Graham |
| 3,628,768 | A | * | 12/1971 | Hutt ....................... F16L 37/144 251/148 |
| 3,753,582 | A | | 8/1973 | Graham |
| 4,526,411 | A | | 7/1985 | Bartholomew |
| 4,591,192 | A | * | 5/1986 | Van Exel .............. F16L 37/144 285/305 |

(Continued)

FOREIGN PATENT DOCUMENTS

JP 06081990 A * 3/1994

*Primary Examiner* — David Bochna
(74) *Attorney, Agent, or Firm* — The Webb Law Firm

(57) ABSTRACT

A pipe connector includes a clip, first pipe fitting, and second pipe fitting. The clip includes a cross member having a first end and a second end and a leg extending from each end. The first pipe fitting includes a connecting portion comprising a first end, a second end, and a sidewall having two slots. The second pipe fitting includes a connecting portion and a first end, a second end, a sidewall extending therebetween, and a circumferential groove in an outer diameter of the sidewall. The circumferential groove aligns with the slots in the sidewall of the first pipe fitting when the second pipe fitting is inserted into the first pipe fitting, and the legs of the clip engage the circumferential groove in the connecting portion of the second pipe fitting, allowing the first pipe fitting and the second pipe fitting to rotate with respect to one another.

18 Claims, 8 Drawing Sheets

(56) References Cited

U.S. PATENT DOCUMENTS

| | | | | |
|---|---|---|---|---|
| 4,707,000 A * | 11/1987 | Torgardh | F16L 37/088 | 285/305 |
| 4,811,975 A * | 3/1989 | Paul, Jr. | F16L 37/144 | 285/305 |
| 4,813,716 A | 3/1989 | Lalikos et al. | | |
| 4,913,182 A * | 4/1990 | Whiteside | F16K 15/025 | 137/543.21 |
| 4,968,067 A * | 11/1990 | Whiteside | F16L 37/144 | 285/305 |
| 5,341,773 A * | 8/1994 | Schulte | F02D 9/105 | 123/184.61 |
| 5,855,399 A * | 1/1999 | Profunser | B60T 17/043 | 285/305 |
| 5,909,725 A * | 6/1999 | Balsdon | F02M 25/0836 | 123/470 |
| 5,964,483 A | 10/1999 | Long et al. | | |
| 6,604,760 B2 | 8/2003 | Cresswell et al. | | |
| 7,438,328 B2 * | 10/2008 | Mori | F16L 37/088 | 285/305 |
| 7,516,989 B2 * | 4/2009 | Yoshida | F16L 37/088 | 285/321 |
| 7,530,605 B2 * | 5/2009 | Rigollet | F16L 37/144 | 285/305 |
| 8,002,315 B2 * | 8/2011 | Engle | G01K 1/14 | 137/557 |
| 8,246,083 B2 * | 8/2012 | Ferrali | F16L 37/148 | 285/305 |
| 2002/0171241 A1 * | 11/2002 | Duong | F24H 9/2035 | 285/305 |
| 2003/0001386 A1 * | 1/2003 | Cresswell | F16L 37/088 | 285/305 |
| 2004/0051313 A1 * | 3/2004 | Trouyet | F16L 37/088 | 285/305 |
| 2004/0178629 A1 * | 9/2004 | Yoshida | F16L 37/088 | 285/305 |
| 2008/0007052 A1 * | 1/2008 | Niki | F16L 37/144 | 285/305 |
| 2009/0058083 A1 * | 3/2009 | Dorman | F16L 37/144 | 285/309 |
| 2009/0160185 A1 * | 6/2009 | Learmont | F16L 37/144 | 285/305 |
| 2011/0039186 A1 | 2/2011 | Bae et al. | | |
| 2013/0014963 A1 * | 1/2013 | Porta | F16L 37/144 | 285/305 |
| 2013/0106097 A1 * | 5/2013 | Kim | F16L 37/144 | 285/119 |

* cited by examiner

CLIP FOR ADJUSTABLE PIPE FITTING

CROSS REFERENCE TO RELATED APPLICATIONS

This application claims the benefit of U.S. Provisional Application No. 61/944,277, filed Feb. 25, 2014, the entire disclosure of which is hereby incorporated by reference in its entirety.

BACKGROUND OF THE INVENTION

Field of the Invention

The present invention relates to a plumbing connector utilizing a clip structure to securely connect two pipe fittings.

Description of Related Art

Generally, two pipe fittings are connected to one another using threaded connections, wherein the first fitting has external threads and the second fitting has internal threads. The internal threads of the first fitting are threaded onto the external threads of the second fitting and the connection is tightened. Often, it is desired that one of the fittings have a specific orientation relative the other fitting. For example, when attaching an elbow to a valve, depending on the design of the valve and/or the system, it may be desirable that the elbow extend away from the valve in a certain direction, for example, to the left, to the right, upward, or downward. This ability to reorient the fittings may be particularly desirable with flush valve fittings used in a small or restrictive environment. With the threaded fitting described above, the orientation of the fittings relative to one another is determined by the threads and the amount of torque that is used to tighten the connection. If, upon tightening of the connection, the fittings are not in the desired orientation relative to one another, the only option is to rotate the fittings relative to one another by applying more torque to tighten the connection further which is often not possible, or by loosening the connection which can lead to leaks. Thus, a plumbing connection system is needed where a secure connection is made between the fittings, yet the fittings are able to rotate freely relative to one another.

SUMMARY OF THE INVENTION

It is therefore an object of the present invention to address some or all of the deficiencies in the prior art.

According to a preferred and non-limiting embodiment of the present invention, provided is a pipe connector comprising a clip, first pipe fitting, and second pipe fitting. The clip comprises a cross member having a first end and a second end and a leg extending from each of the first end and the second end of the cross member. The first pipe fitting comprises a connecting portion having a circular cross-section and comprising a first end, a second end, and a sidewall extending therebetween, the sidewall comprising two slots and two extension portions, each extension portion defining one of the two slots, and each slot having at least one opening. The second pipe fitting comprises a connecting portion having a circular cross-section, and a first end, a second end, a sidewall extending therebetween, and a first circumferential groove in an outer diameter of the sidewall. The sidewall of the second pipe fitting has an outer diameter smaller than the inner diameter of the first pipe fitting, and the connecting portion of the second pipe fitting is adapted to be inserted into the connecting portion of the first pipe fitting, and the first circumferential groove in the connecting portion of the second pipe fitting aligns with the two slots in the first pipe fitting when the second pipe fitting is inserted into the first pipe fitting. The legs of the clip engage the first circumferential groove in the connecting portion of the second pipe fitting when the second pipe fitting is inserted into the first pipe fitting and the legs of the clip extend through the two slots, thereby allowing the first pipe fitting and the second pipe fitting to rotate with respect to one another.

In non-limiting embodiments, the legs each comprise an arcuate portion, and the arcuate portions engage the first circumferential groove. Each of the slots may have two openings. In non-limiting embodiments, the connecting portion of the second pipe fitting further comprises a flange having an outer diameter greater than the inner diameter of the sidewall of the first pipe fitting, wherein the flange abuts the first end of the first pipe fitting to limit the distance which the connecting portion of the second pipe fitting may be inserted into the first pipe fitting.

The second pipe fitting may also include, in non-limiting embodiments, a second circumferential groove on the outer diameter of the sidewall of the connecting portion and an O-ring inserted in the second circumferential groove. In non-limiting embodiments, the second circumferential groove containing the O-ring is closer to the first end of the connecting portion of the second pipe fitting than the first circumferential groove. The O-ring may have a thickness greater than a depth of the second circumferential groove.

In non-limiting embodiments, the width of the legs of the clip is greater than a depth of the first circumferential groove. Further, the sidewall of the connecting portion of the first pipe fitting may comprise two portions: a first portion adjacent the first end and having a first inner diameter and a second portion adjacent the second end and having a second inner diameter, wherein the second inner diameter of the second portion is smaller than the first inner diameter of the first portion and a ledge is created where the first portion meets the second portion. In non-limiting embodiments, the sidewall of the connecting portion of the second pipe fitting may also include two portions: a first portion adjacent the first end and having a first outer diameter, and a second portion adjacent the second end and having a second outer diameter, wherein the second outer diameter of the second portion is greater than the first outer diameter of the first portion and a ledge is created where the first portion meets the second portion.

In non-limiting embodiments, the inner diameter of the sidewall is reduced creating a ledge at the second end of the first pipe fitting. The first end of the second pipe fitting may abut the ledge. Further, in some non-limiting embodiments, the distance between the legs of the clip is equal to or less than the outer diameter of the second pipe fitting at a bottom of the first circumferential groove.

According to another preferred and non-limiting embodiment, provided is a pipe connection arrangement for a flush valve, comprising a flush valve comprising a first pipe fitting including a connecting portion having a sidewall comprising two slots, an elbow pipe fitting comprising a connecting portion adapted to be inserted into the connecting portion of the first pipe fitting, and a clip. The connecting portion of the second pipe fitting may include at least one circumferential groove. The clip comprises two legs adapted to extend through the two slots in the sidewall of the first pipe fitting and, when the first pipe fitting is inserted into the second pipe fitting and the clip is inserted into the two slots, the legs of the clip engage the at least one circumferential groove in the connecting portion of the second pipe fitting such that the elbow pipe fitting and first pipe fitting are connected and rotate with respect to one another.

In non-limiting embodiments, the first pipe fitting comprises an extended portion and a non-extended portion, the extended portion having an outer diameter greater than an outer diameter of the non-extended portion, and the extended portion comprises the two slots. In non-limiting embodiments, each of the legs comprise an arcuate portion, wherein the arcuate portions engage the first circumferential groove. Further, the elbow pipe fitting may also comprise a second circumferential groove on the outer diameter of the sidewall of the connecting portion and an O-ring inserted in the second circumferential groove. In non-limiting embodiments, the inner diameter of the sidewall is reduced creating a ledge at the second end of the first pipe fitting, and the first end of the elbow pipe fitting abuts the ledge.

According to a further preferred and non-limiting embodiment, provided is a pipe connection arrangement for a flush valve, comprising a flush valve and a clip. The flush valve comprises a connecting portion having a sidewall, the sidewall comprising two openings, the connecting portion adapted to receive a connecting portion of an elbow pipe fitting. The clip comprises two legs each having arcuate portions, the two legs adapted to be inserted into the two openings in the sidewall of the first pipe fitting and, when the first pipe fitting is inserted into the elbow pipe fitting and the clip is inserted into the two openings, the arcuate portions of the legs engage an outer sidewall of the elbow pipe fitting such that the elbow pipe fitting and flush valve are connected. The clip facilitates the elbow pipe fitting to rotate with respect to the flush valve. In a non-limiting embodiment, the connecting portion of the flush valve comprises two extended portions opposite each other, the two extended portions defining the two openings.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE INVENTION

Figure 1:
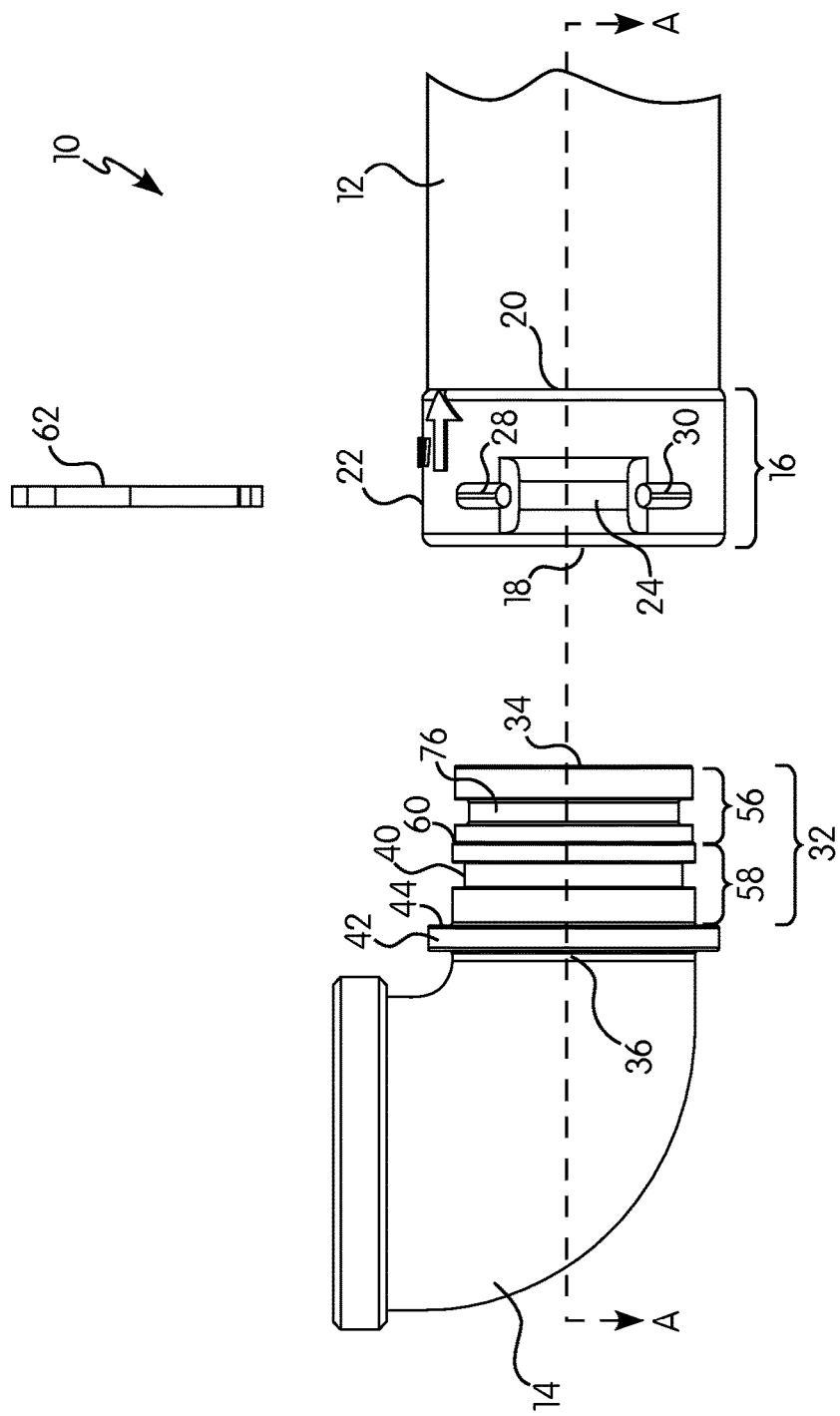
FIG. 1 is a perspective view of the plumbing connector before making the connection.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations except where expressly specified to the contrary.

Figure 2:
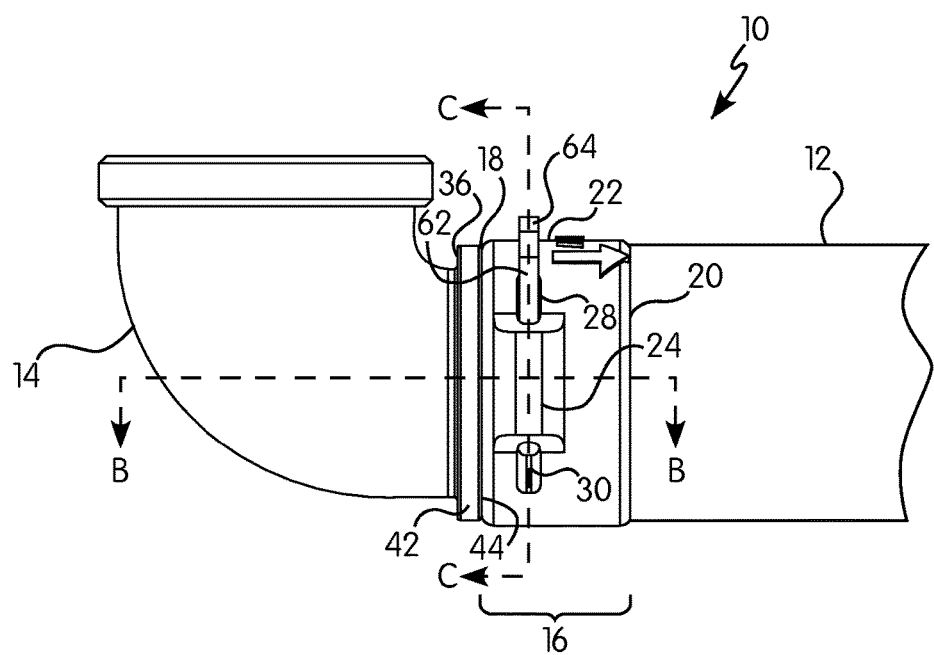
FIG. 2 is a perspective view of the plumbing connector after making the connection.

FIGS. 1-6 depict a plumbing connection 10 according to a preferred and non-limiting embodiment. As shown in FIGS. 1 and 2, the plumbing connection 10 comprises a first pipe fitting 12 and a second pipe fitting 14. In this embodiment, the first pipe fitting 12 is an inlet for a valve and the second pipe fitting 14 is an elbow. However, the two fittings 12, 14 may be chosen from any number of plumbing fittings including, but not limited to, straight pipe sections, tees, outlets of valves, and the like.

Figure 3:
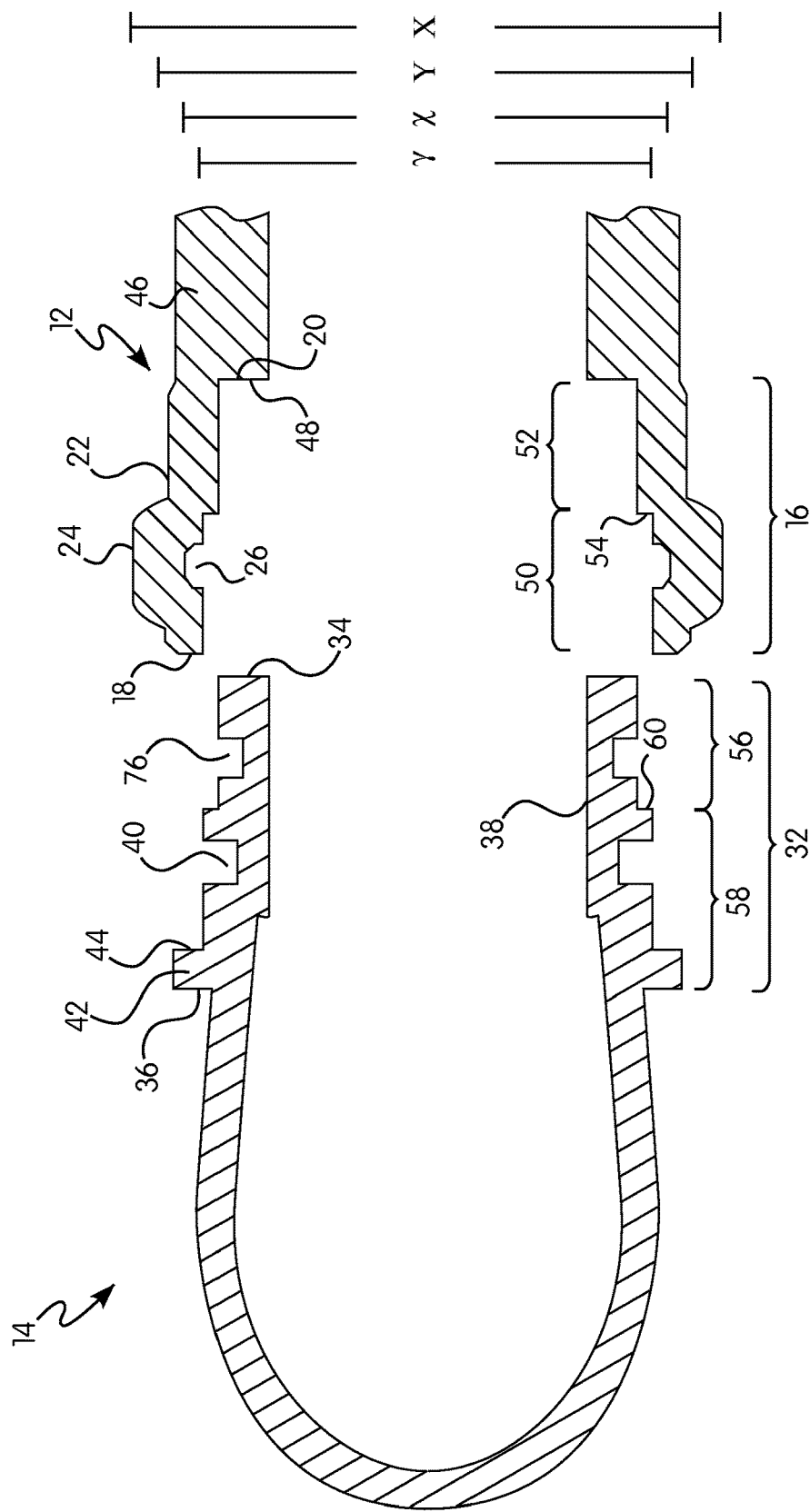
FIG. 3 is cross-sectional view of the plumbing connector of FIG. 1 along axis A-A.
Figure 4:
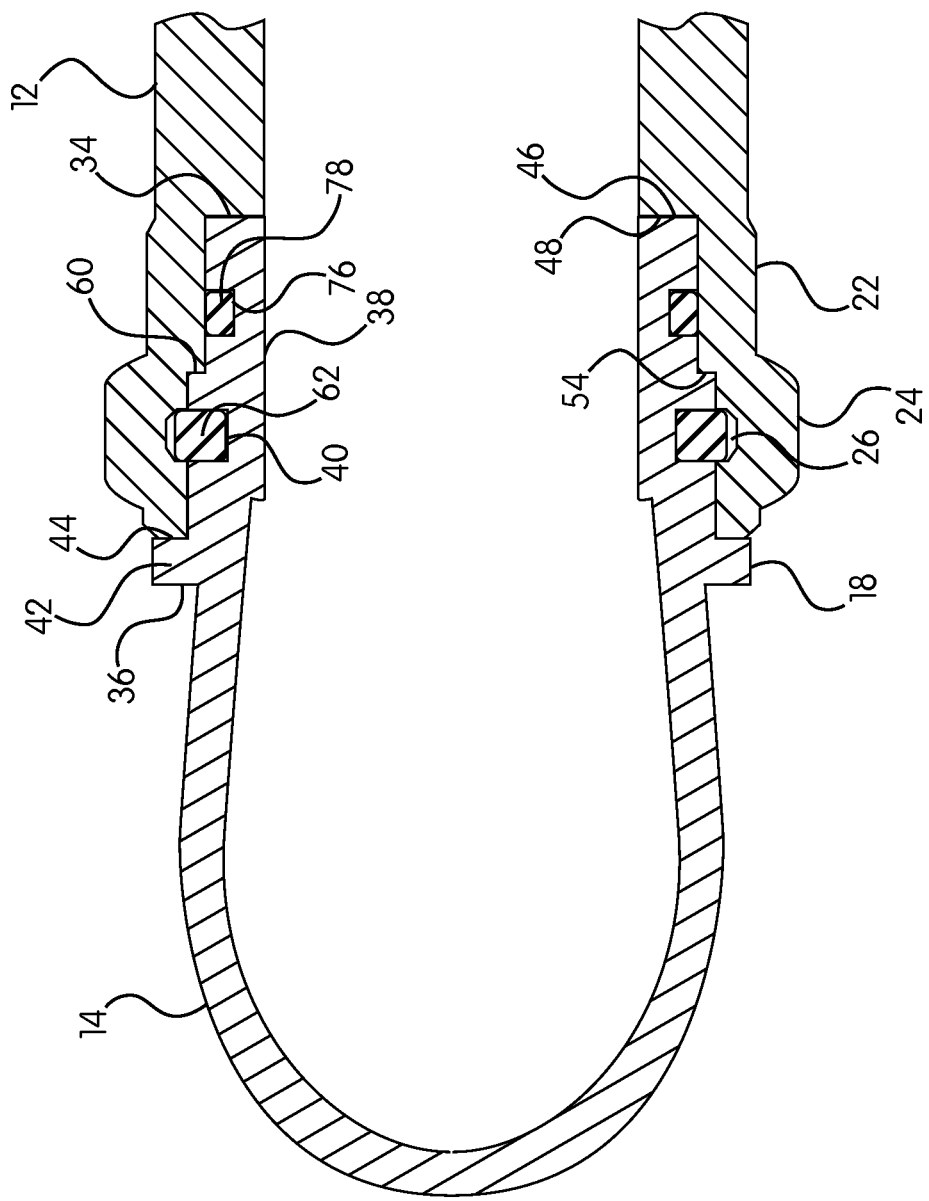
FIG. 4 is cross-sectional view of the plumbing connector of FIG. 2 along axis B-B.

As shown in FIGS. 1-3, in non-limiting embodiments the first pipe fitting 12 has a connecting portion 16 having a circular cross-section and comprising a first end 18, a second end 20, and a sidewall 22 extending therebetween. The sidewall 22 of the first fitting 12 includes opposing extension portions 24 placed directly opposite one another. In some examples, the sidewall 22 may be thick enough to not have extension portions 24. As shown in FIG. 3, the outer diameter X of the sidewall 22 at the extension portions 24 is greater than the outer diameter Y of the non-extended portions of the sidewall 22 and the inner diameter x of the sidewall 22 at the extension portions 24 is greater than the inner diameter y of the non-extended portions of the sidewall 22. The extension portions 24 define slots 26 in the sidewall 22. It will be appreciated that, in some embodiments without extension portions 24, the slots may pass through a thicker sidewall. Each slot 26 has a top opening 28 and a bottom opening 30. It will be appreciated that the slots may be any type of opening in the sidewalls of a fitting. A slot may be substantially straight, curved, or in any other shape, and may run through the sidewall (i.e., have two openings) or only partially through the sidewall (i.e., have one opening).

The second pipe fitting 14, in non-limiting embodiments, has a connecting portion 32 having a circular cross-section and comprising a first end 34, a second end 36, a sidewall 38 extending therebetween, and a first circumferential groove 40 in the outer diameter of the sidewall 38. The connecting portion 32 may not have any threads. The outer diameter of the sidewall 38 of the second fitting 14 is smaller than the inner diameter of the non-extended portion of the sidewall 22 of the first fitting 12. The connecting portion 32 of the second fitting 14 is inserted into the connecting portion 16 of the first fitting 12 such that the first circumferential groove 40 on the outer diameter of the sidewall 38 of the second fitting 14 aligns with the slots 26 in the extension portions 24 of the first fitting 12.

In non-limiting embodiments, several additional features may be provided in the connecting portions of the first 12 and second 14 fittings to ensure alignment of the first circumferential groove 40 in the second fitting 14 with the slots 26 in the extension portions 24 of the sidewall 22 of the first fitting 12. In the embodiment shown in FIGS. 3 and 4, all of the described features are shown; however, it is to be understood that any individual feature may be used alone or in any combination with any other feature.

In non-limiting embodiments, a flange 42 may be provided on the second end 36 of the connecting portion 32 of the second fitting 14. The flange 42 has an outer diameter greater than the inner diameter of the non-extended portion of the sidewall 22 of the first fitting 12. The flange 42 abuts the first end 18 of the connecting portion 16 of the first fitting 12 limiting the distance that the connecting portion 32 of the second fitting 14 may be inserted into the first fitting 12. The distance between the bottom 44 of the flange 42 of the second fitting 14 and the first circumferential groove 40 of the second fitting 14 and the distance between the first end 18 of the connecting portion 16 of the first fitting 12 and the slots 26 in the extension portions 24 of the sidewall 22 of the first fitting 12 are the same so that insertion of the connecting portion 32 of the second fitting 14 into the connecting portion 16 of the first fitting 12 such that the bottom 44 of the flange 42 of the second fitting 14 abuts the first end 18 of the connecting portion 16 of the first fitting 12 results in alignment of the first circumferential groove 40 in the second fitting 14 with the slots 26 in the first fitting 12.

Alternatively, or in addition, at the second end 20 of the connecting portion 16 of the first fitting 12, a portion 46 of the sidewall 22 may have an inner diameter that is less than the inner diameter of the non-extended portion of the sidewall 22 creating a ledge 48. The first end 34 of the connecting portion 32 of the second fitting 14 abuts the ledge 48 of the first fitting 12 limiting the distance that the connecting portion 32 of the second fitting 14 may be inserted into the first fitting 12. The distance between the first end 34 of the connecting portion 32 of the second fitting 14 and the first circumferential groove 40 and the distance between the ledge 48 of the first fitting 12 and the slots 26 in the extension portions 24 of the sidewall 22 of the first fitting 12 are the same so that insertion of the connecting portion 32 of the second fitting 14 into the connecting portion 16 of the first fitting 12 such that the ledge 48 of the first fitting 12 abuts the first end 34 of the connecting portion 32 of the second fitting 14 results in alignment of the first circumferential groove 40 in the second fitting 14 with the slots 26 in the first fitting 12.

Alternatively, or in addition, the non-extended sidewall 22 of the connecting portion 16 of the first pipe fitting 12 may comprise two portions: a first portion 50 adjacent the first end 18 of the connecting portion 16 and having a first inner diameter and a second portion 52 adjacent the second end 20 of the connecting portion 16 and having a second inner diameter. The second inner diameter of the second portion 52 is smaller than the first inner diameter of the first portion 50 and a ledge 54 is created where the first portion 50 meets the second portion 52. The extension portions 24 of the sidewall 22 of the first pipe fitting 12 are located in the first portion 50 of the sidewall 22 of the first pipe fitting 12.

In non-limiting embodiments, the sidewall 22 of the connecting portion 32 of the second pipe fitting 14 may also comprise two portions: a first portion 56 adjacent the first end 34 and having a first outer diameter and a second portion 58 adjacent the second end 36 and having a second outer diameter, wherein the second outer diameter of the second portion 58 is greater than the first outer diameter of the first portion 56 and a ledge 60 is created where the first portion 56 meets the second portion 58. The first circumferential groove 40 is located in the second portion 58 of the sidewall 22 of the second pipe fitting 14.

The ledge 48 of the first fitting 12 abuts the ledge 60 of the second fitting 14 limiting the distance that the connecting portion 32 of the second fitting 14 may be inserted into the first fitting 12. The distance between the ledge 60 of the second fitting 14 and the first circumferential groove 40 and the distance between the ledge 48 of the first fitting 12 and the slots 26 in the extension portions 24 of the sidewall 22 of the first fitting 12 are the same so that insertion of the connecting portion 32 of the second fitting 14 into the connecting portion 16 of the first fitting 12 such that the ledges 48, 60 abut one another which results in alignment of the first circumferential groove 40 in the second fitting 14 with the slots 26 in the first fitting 12.

As shown in FIGS. 1, 2, and 4-6, a U-shaped clip 62 is shown according to a preferred but non-limiting embodiment. The clip 62 is provided for securely, yet rotatably, connecting the first fitting 12 to the second fitting 14. The clip 62 comprises a cross member 64 having a first end 66 and a second end 68 and a leg 70 extending from each end 66, 68 of the cross member 64. The legs 70 are generally parallel to one another and perpendicular to the cross member 64, however it will be appreciated that the cross member 64 may also be curved. The legs 70 may take any shape such that each leg 70 is adapted to pass through the top opening 28 of the slot 26 in an extension portion 24 of the sidewall 22 of the first fitting 12, or in the sidewall 22 in embodiments not including an extension portion 24. In some examples, when the slot extends through the sidewall 22, the legs may extend through the slot 26 and out of the bottom 30 of the slot 26. Each leg 70 is also adapted to engage both the first circumferential groove 40 in the connecting portion 32 of the second pipe fitting 14 and the slots 26 in the extension portions 24 of the first pipe fitting 12 when the leg 70 is placed through the slot 26 to securely connect the first pipe fitting 12 and the second pipe fitting 14. Therefore, the width of at least part of the leg 70 is greater than the depth of the first circumferential groove 40 in order to allow a portion of the leg 70 to engage the slot 26.

The clip 62 securely connects the first fitting 12 to the second fitting 14 by clamping onto the first circumferential groove 40 in the second fitting 14 and attaching the second fitting 14 to the first fitting 12 via engagement of the legs 70 with the slots 26 defined by the extension portions 24 of the sidewall 22 of the first fitting 12 and the engagement of the cross member 64 with the outer diameter of the sidewall 22 of the connecting portion 16 of the first fitting 12. Also, the extension portions 24 of the sidewall 22 of the first fitting 12 allow the legs 70 to flex out and away from the connecting portion 32 of the second fitting 14 to aid insertion and removal of the clip 62, yet still provide a cover for the legs 70 of the clip 62 to make it more difficult for the clip 62 to accidently become disengaged from the second fitting 14, thus providing additional security to the connection.

In non-limiting embodiments, the legs 70 of the clip 62 may have several additional features to improve the ease of insertion of the clip 62 into the slots 26 and/or improve the securement of the first fitting 12 to the second fitting 14. In the embodiment shown in FIGS. 5 and 6, all of the described features are shown; however, it is to be understood that any individual feature may be used alone or in any combination with any other feature.

Figure 5:
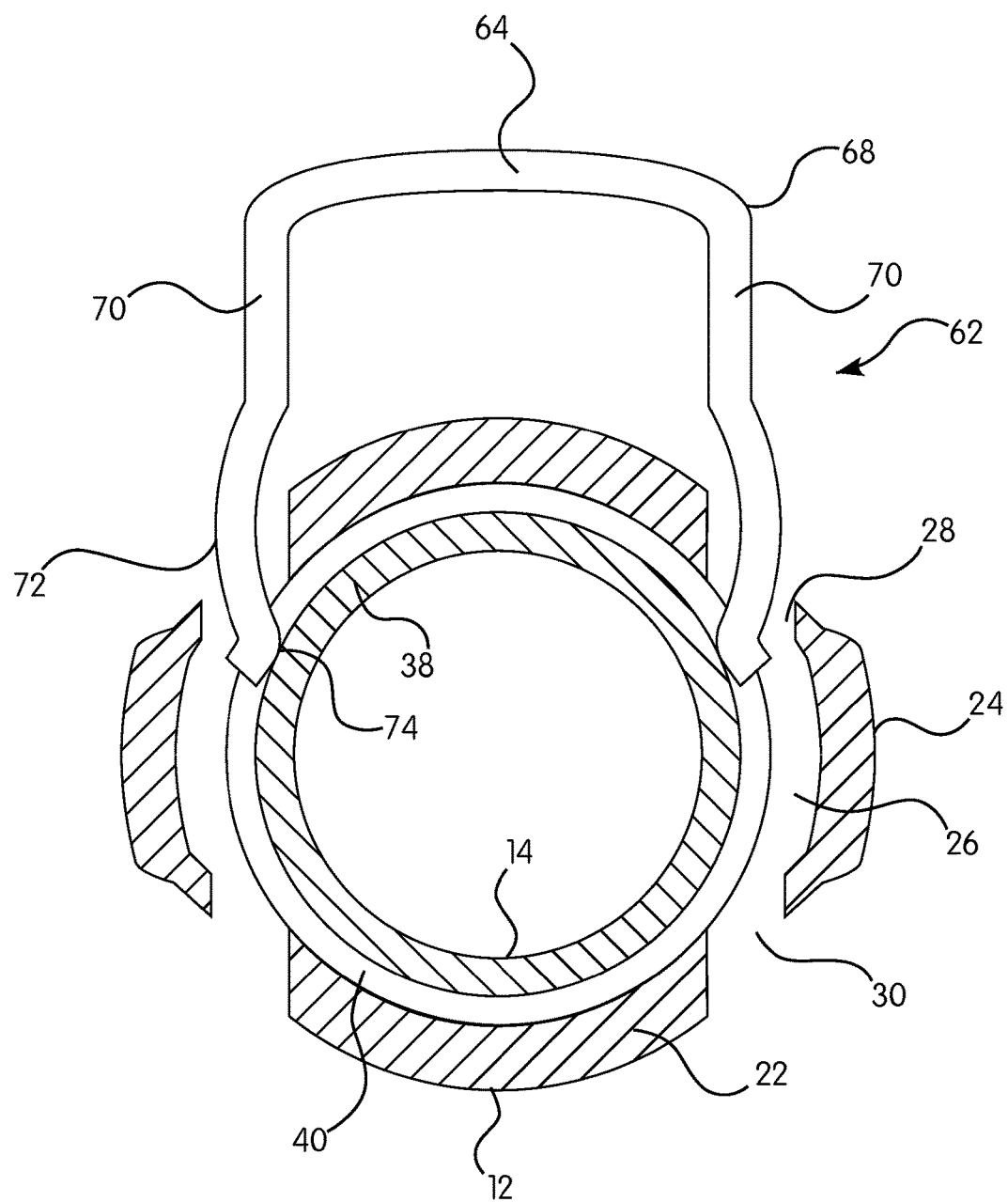
FIG. 5 is cross-sectional view of the plumbing connector of FIG. 2 along axis C-C before the clip has been fully inserted.
Figure 6:
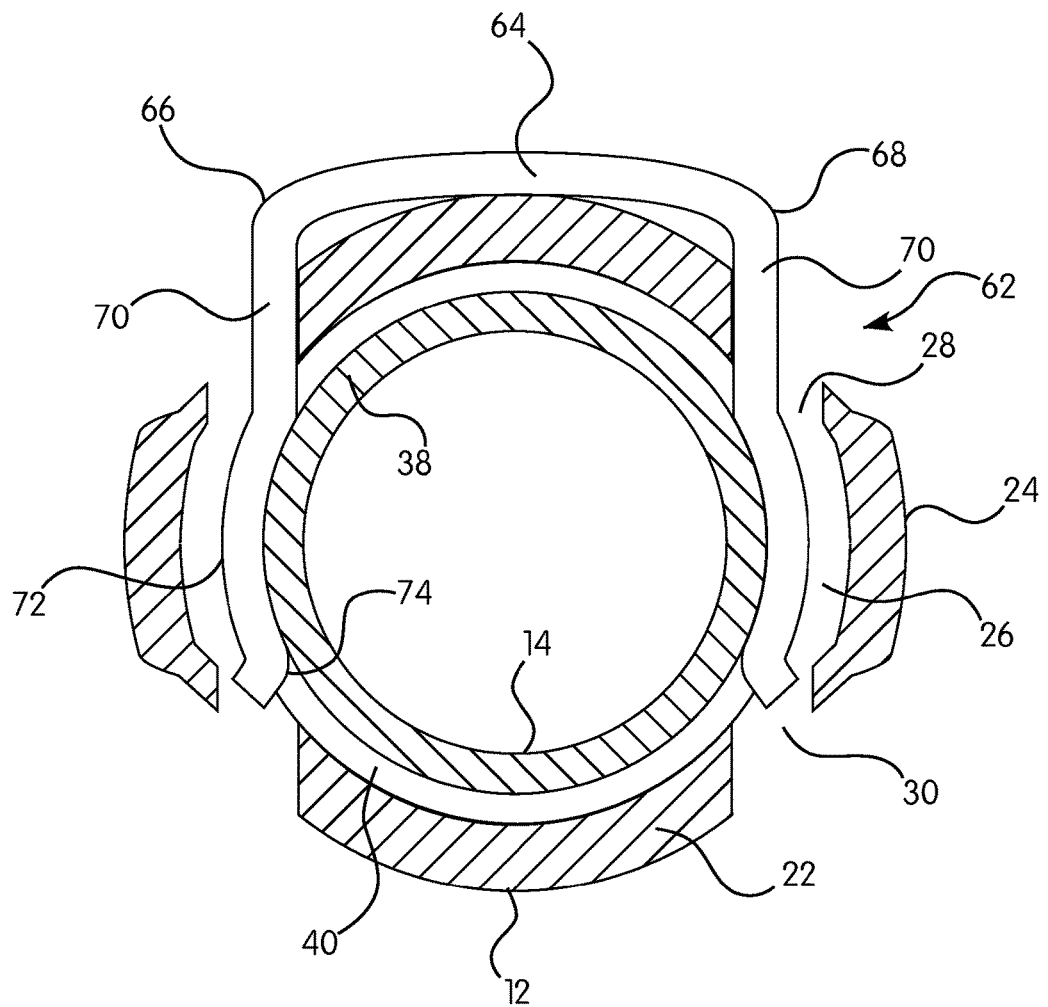
FIG. 6 is cross-sectional view of the plumbing connector of FIG. 2 along axis C-C after full insertion of the clip.

For example, with continued reference to FIGS. 5 and 6, the legs 70 may include an arcuate portion 72 in non-limiting embodiments. The arcuate portion 72 of the legs 70 may be adapted to engage the first circumferential groove 40 in the outer diameter of the sidewall 22 of the connecting portion 32 of the second fitting 14 and generally have a curve that corresponds to the curved surface of the bottom 30 of the first circumferential groove 40. The maximum distance between the arcuate portions 72 of the legs 70 may be equal to or smaller than the outer diameter of the sidewall 38 of the second fitting 14 at the bottom 30 of the first circumferential groove 40 so that the arcuate portions 72 of the legs 70 tightly clamp the second fitting 14. The arcuate portions 72 may be distanced along the length of the legs 70 such that, when the arcuate portions 72 engage the first circumferential groove 40 in the outer diameter of the sidewall 38 of the second fitting 14 and the slots 26 in the extension portions 24 of the sidewall 22 of the first fitting 12, the cross member 64 contacts the outer diameter of the sidewall 22 of the connecting portion 16 of the first fitting 12.

In addition, or alternatively, the legs 70 of the clip 62 may comprise a contact surface 74 at the end of the leg 70 that is not connected to the cross member 64. The distance between the contact surfaces 74 of the legs 70 is smaller than the outer diameter of the sidewall 38 of the second fitting 14 at the bottom 30 of the first circumferential groove 40. Thus, when the clip 62 is inserted into the slots 26 defined by the extension portions 24 of the sidewall 22 of the first fitting 12, the legs 70 are pushed away from one another by the contact of the contact surfaces 74 of the legs 70 with the bottom 30 of the first circumferential groove 40 in the sidewall 38 of the second fitting 14 (FIG. 5). The legs 70 are at a greater distance apart when the contact surfaces 74 of the legs 70 contact the bottom 30 of the first circumferential groove 40 at the diameter of the sidewall 38 of the contacting portion 32 of the second fitting 14. As the contact surfaces 74 of the legs 70 proceed past the diameter of the sidewall 38 of the connecting portion 32 of the second fitting 14, they gradually move back towards one another. When the clip 62 has been inserted to the point where the cross member 64 contacts the outer diameter of the sidewall 22 of the connecting portion 16 of the first fitting 12, the contact surfaces 74 of the legs 70 may be in contact with the bottom 30 of the first circumferential groove 40 such that the clip 62 is clamped onto the connecting portion 32 of the second fitting 14 by the contact surfaces 74 as well as the arcuate portions 72 if they are present (FIG. 6).

As shown in FIGS. 2 and 3, the connecting portion 32 of the second fitting 14 may further comprise a second circumferential groove 76 closer to the first end 34 of the connecting portion 32 of the second fitting 14 than the first circumferential groove 40. If the connecting portion 32 of the second fitting 14 has two portions 56, 58 having different outer diameters and forming a ledge 60 as described above, the second circumferential groove 76 is located in the first portion 56 adjacent the first end 34 of the connecting portion 32. An O-ring 78 is placed in the second circumferential groove 76. The thickness of the O-ring 78 is greater than the depth of the second circumferential groove 76 such that the O-ring 78 is compressed between the outer diameter of the second fitting 14 and the inner diameter of the first fitting 12 to form a water tight seal.

Figure 7A:
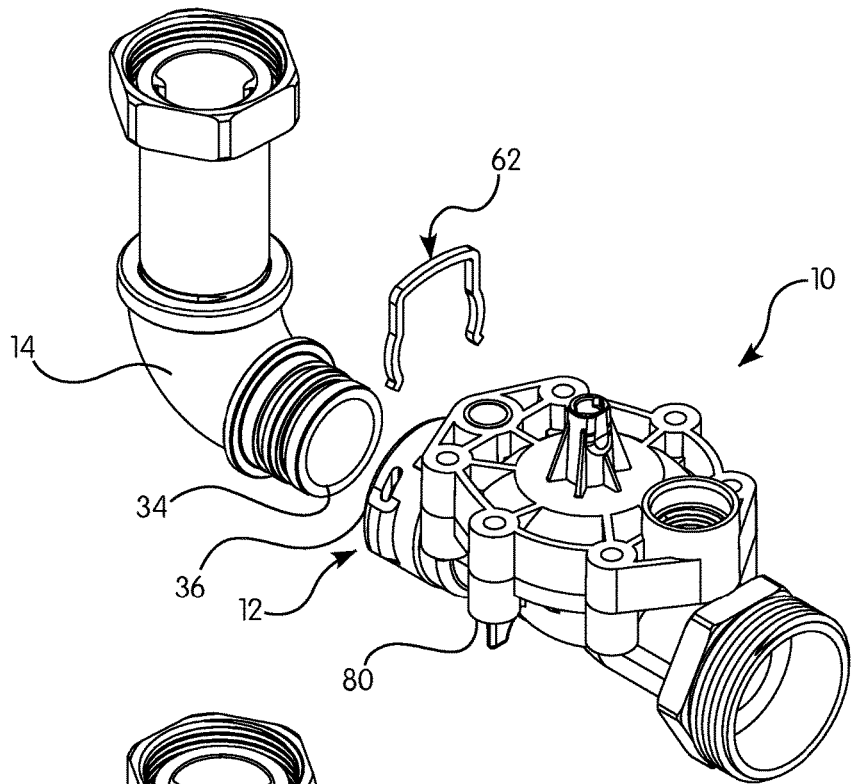
FIG. 7A is an exploded perspective view of the plumbing connector and a flush valve.
Figure 7B:
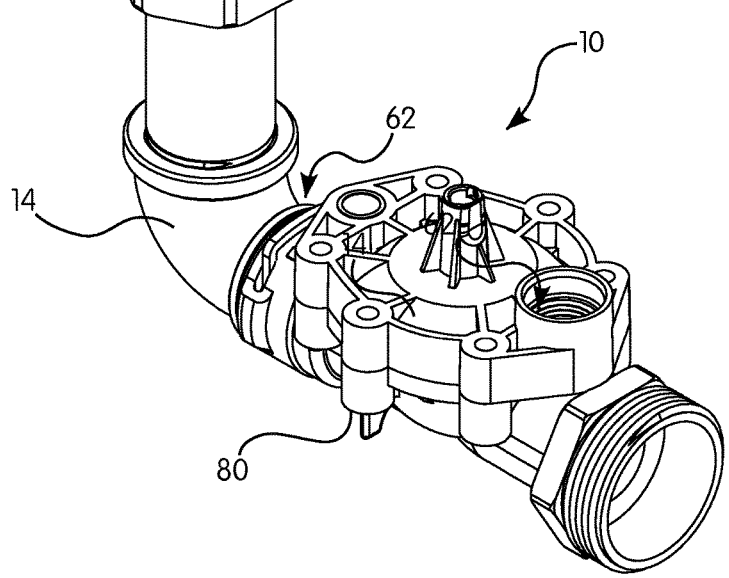
FIG. 7B is a perspective view of the plumbing connector and flush valve shown in FIG. 7A.
Figure 7C:
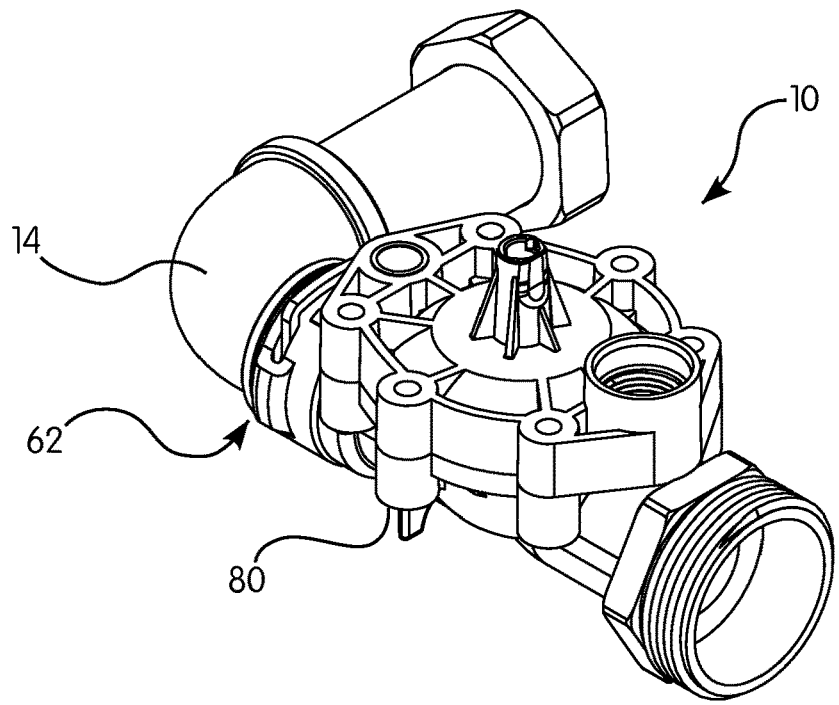
FIGS. 7C-7D are perspective views of the plumbing connector and flush valve of FIGS. 7A and 7B in differing orientations.
Figure 7D:
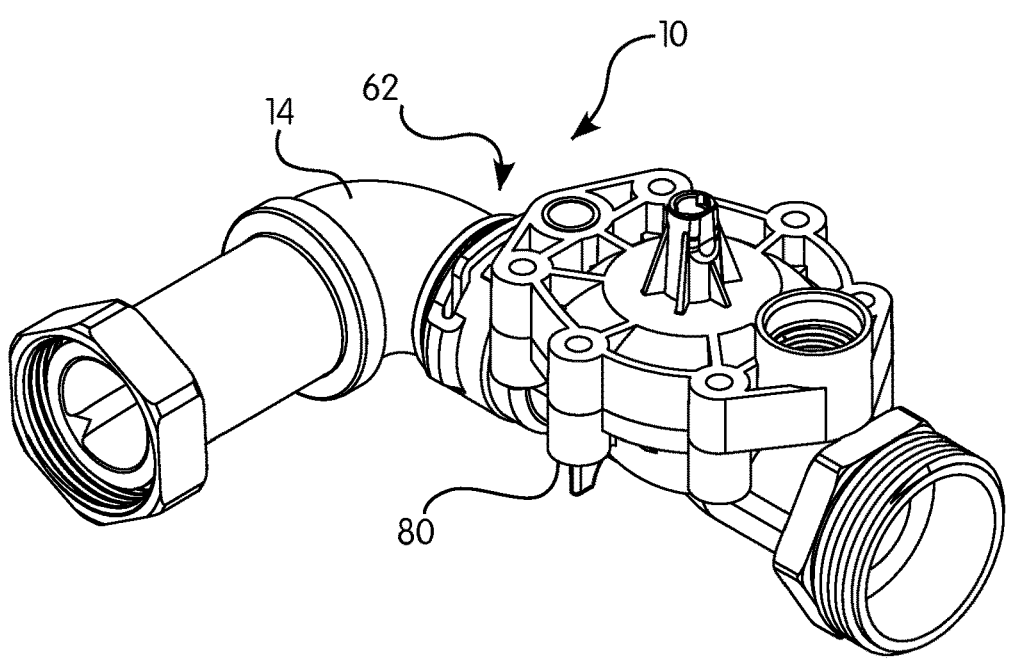

FIGS. 7A-7D illustrate the plumbing connector 10 used to connect a flush valve 80 to a second pipe fitting 14 according to a preferred and non-limiting embodiment. FIG. 7A illustrates an exploded view of the plumbing connector 10, including the arrangement of the first end 34 of the second fitting 14, the U-shaped clip 62, and a flush valve 80. FIG. 7B illustrates the plumbing connector 10 with the second fitting 14 in an upright position. As explained herein, with the clip 62 in place, the second fitting 14 can be rotated with respect to the flush valve 80 and, likewise, the flush valve 80 can be rotated with respect to the second fitting 14. For example, in FIG. 7C, the second fitting 14 is rotated to the right with respect to the flush valve 80 and, conversely in FIG. 7D, the second fitting 14 is rotated to the left with respect to the flush valve 80. In this way, a flush valve 80 may be positioned in a restricted space while providing some flexibility in the arrangement of pipes.

With continued reference to FIGS. 7A-7D, an elbow fitting 14 connects to the flush valve 80 and can rotate with respect to the flush valve 80. This allows for the flush valve 80 to be installed in narrow spaces. In the embodiment shown, the flush valve 80 comprises a fitting having slots that receive the U-shaped clip 62. However, it will be appreciated that the elbow fitting 14 may also include the slots and receive the U-shaped clip 62, such that the features of the respective fittings are reversed.

In an alternative embodiment, the plumbing connector 10 may be adapted to prevent rotation of the second fitting 14 and/or flush valve 80 with respect to one another when the clip 62 is in place. In this alternative embodiment, the second fitting 14 and/or flush valve 80 may be rotated prior to the clip 62 being inserted, or while the clip 62 is only partially inserted, such that the components are axially locked by the clip 62.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of this specification. For example, it is to be understood that the present invention contemplates that, to the extent possible, one or more features of any embodiment can be combined with one or more features of any other embodiment.

The invention claimed is:

1. A pipe connector comprising:
a clip comprising a cross member having a first end and a second end and a leg extending from each of the first end and the second end of the cross member;
a first pipe fitting comprising a connecting portion having a circular cross-section and comprising a first end, a second end, and a sidewall extending therebetween, the sidewall comprising two slots and two extension portions, each extension portion defining one of the two slots, each slot having at least one opening; and
a second pipe fitting comprising a connecting portion having a circular cross-section and comprising a first end, a second end, a sidewall extending therebetween, and a first circumferential groove in an outer diameter of the sidewall, wherein the sidewall of the second pipe fitting has an outer diameter smaller than the inner diameter of the first pipe fitting and the connecting portion of the second pipe fitting is adapted to be inserted into the connecting portion of the first pipe fitting, and wherein the first circumferential groove in the connecting portion of the second pipe fitting aligns with the two slots in the first pipe fitting when the second pipe fitting is inserted into the first pipe fitting, and wherein the legs of the clip engage the first circumferential groove in the connecting portion of the second pipe fitting when the second pipe fitting is inserted into the first pipe fitting and the legs of the clip extend through the two slots, thereby allowing the first pipe fitting and the second pipe fitting to rotate with respect to one another, wherein a width of the legs of the clip is greater than a depth of the first circumferential groove, wherein the legs each comprise an arcuate portion, and wherein the arcuate portions engage the first circumferential groove.

2. The pipe connector of claim 1, wherein each of the two slots have two openings.

3. The pipe connector of claim 1, wherein the connecting portion of the second pipe fitting further comprises a flange having an outer diameter greater than the inner diameter of the sidewall of the first pipe fitting and the flange abuts the first end of the first pipe fitting to limit the distance which the connecting portion of the second pipe fitting may then be inserted into the first pipe fitting.

4. The pipe connector of claim 1, wherein the second pipe fitting further comprises a second circumferential groove on the outer diameter of the sidewall of the connecting portion and an O-ring inserted in the second circumferential groove.

5. The pipe connector of claim 4, wherein the second circumferential groove containing the O-ring is closer to the first end of the connecting portion of the second pipe fitting than the first circumferential groove.

6. The pipe connector of claim 4, wherein the O-ring has a thickness greater than a depth of the second circumferential groove.

7. The pipe connector of claim 1, wherein the sidewall of the connecting portion of the first pipe fitting comprises two portions: a first portion adjacent the first end and having a first inner diameter and a second portion adjacent the second end and having a second inner diameter, wherein the second inner diameter of the second portion is smaller than the first inner diameter of the first portion and a ledge is created where the first portion meets the second portion.

8. The pipe connector of claim 7, wherein the sidewall of the connecting portion of the second pipe fitting comprises two portions: a first portion adjacent the first end and having a first outer diameter, and a second portion adjacent the second end and having a second outer diameter, wherein the second outer diameter of the second portion is greater than the first outer diameter of the first portion and a ledge is created where the first portion meets the second portion.

9. The pipe connector of claim 1, wherein at the second end of the first pipe fitting, the inner diameter of the sidewall is reduced creating a ledge.

10. The pipe connector of claim 9, wherein the first end of the second pipe fitting abuts the ledge.

11. The pipe connector of claim 1, wherein the distance between the legs of the clip is equal to or less than the outer diameter of the second pipe fitting at a bottom of the first circumferential groove.

12. A pipe connection arrangement for a flush valve, comprising:
a flush valve comprising a first pipe fitting including a connecting portion having a sidewall, the sidewall comprising two slots;
an elbow pipe fitting comprising a connecting portion adapted to be inserted into the connecting portion of the first pipe fitting, the connecting portion of the elbow pipe fitting including at least one circumferential groove; and
a clip comprising two legs adapted to extend through the two slots in the sidewall of the first pipe fitting and, when the first pipe fitting is inserted into the elbow pipe fitting and the clip is inserted into the two slots, the legs of the clip engage the at least one circumferential groove in the connecting portion of the elbow pipe fitting such that the elbow pipe fitting and first pipe fitting are connected and rotate with respect to one another.

13. The pipe connection arrangement of claim 12, wherein the first pipe fitting comprises an extended portion and a non-extended portion, the extended portion having an outer diameter greater than an outer diameter of the non-extended portion, and wherein the extended portion of the first pipe fitting comprises the two slots.

14. The pipe connection arrangement of claim 12, wherein each of the legs comprise an arcuate portion, wherein the arcuate portions engage the first circumferential groove.

15. The pipe connection arrangement of claim 12, wherein the elbow pipe fitting further comprising a second circumferential groove on the outer diameter of the sidewall of the connecting portion and an O-ring inserted in the second circumferential groove.

16. The connection arrangement of claim 12, wherein at the second end of the first pipe fitting, the inner diameter of the sidewall is reduced creating a ledge, and wherein the first end of the elbow pipe fitting abuts the ledge.

17. A pipe connection arrangement for a flush valve, comprising:
a flush valve comprising a connecting portion having a sidewall, the sidewall comprising two openings, the connecting portion adapted to receive a connecting portion of an elbow pipe fitting; and
a clip comprising two legs each having arcuate portions, the two legs adapted to be inserted into the two openings in the sidewall of the connecting portion of the flush valve and, when the flush valve and the elbow pipe fitting are engaged and the clip is inserted into the two openings, the arcuate portions of the legs engage an outer sidewall of the elbow pipe fitting such that the elbow pipe fitting and flush valve are connected, wherein the clip facilitates the elbow pipe fitting to rotate with respect to the flush valve.

18. The pipe connection arrangement of claim 17, wherein the connecting portion of the flush valve comprises two extended portions opposite each other, the two extended portions defining the two openings.

* * * * *